(12) United States Patent
Tanaka et al.

(10) Patent No.: US 11,859,572 B2
(45) Date of Patent: Jan. 2, 2024

(54) FUEL INJECTION CONTROL DEVICE

(71) Applicant: MITSUBISHI HEAVY INDUSTRIES, LTD., Tokyo (JP)

(72) Inventors: Kengo Tanaka, Tokyo (JP); Takashi Ueda, Tokyo (JP); Yuki Koshiba, Tokyo (JP); Sigetoshi Sugata, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/790,638

(22) PCT Filed: Mar. 17, 2021

(86) PCT No.: PCT/JP2021/010830
§ 371 (c)(1),
(2) Date: Jul. 1, 2022

(87) PCT Pub. No.: WO2021/187528
PCT Pub. Date: Sep. 23, 2021

(65) Prior Publication Data
US 2023/0044405 A1 Feb. 9, 2023

(30) Foreign Application Priority Data
Mar. 19, 2020 (JP) .................. 2020-049683

(51) Int. Cl.
*F02D 41/24* (2006.01)
*F02D 35/02* (2006.01)

(52) U.S. Cl.
CPC .......... *F02D 41/2467* (2013.01); *F02D 35/02* (2013.01); *F02D 2200/0604* (2013.01); *F02D 2400/04* (2013.01)

(58) Field of Classification Search
CPC .............. F02D 41/2467; F02D 35/02; F02D 2200/0604; F02D 2400/04;
(Continued)

(56) References Cited

U.S. PATENT DOCUMENTS 5,520,161 A * 5/1996 Klopp ................ F02D 41/0077
123/568.24
6,712,036 B1 * 3/2004 Andersson .......... F02B 23/0645
123/299

(Continued)

FOREIGN PATENT DOCUMENTS

JP 2013-83271 A 5/2013
JP 2014-156852 A 8/2014

OTHER PUBLICATIONS

International Search Report (PCT/ISA/210) issued in PCT/JP2021/010830, dated May 25, 2021.
(Continued)

*Primary Examiner* — Phutthiwat Wongwian
*Assistant Examiner* — Susan E Scharpf
(74) *Attorney, Agent, or Firm* — Birch, Stewart, Kolasch & Birch, LLP (57) ABSTRACT

A fuel injection control device according to an embodiment is a device for controlling fuel injection performed by a fuel injection device disposed in a cylinder of a two-stroke engine, comprising: a scavenging and exhaust gas state quantity acquisition part configured to acquire a parameter related to a state quantity of scavenging and exhaust gas in the cylinder; a swirl momentum calculation part configured to calculate a momentum of swirl generated in the cylinder on the basis of the parameter; and a fuel injection pressure calculation part configured to calculate an injection pressure
(Continued)

of fuel from the fuel injection device corresponding to the momentum of swirl calculated by the swirl momentum calculation part.

3 Claims, 7 Drawing Sheets

(58) Field of Classification Search
CPC ..... F02D 2200/0402; F02D 2200/0406; F02D 41/0002; F02D 2041/0015; F02D 2041/389; F02D 2200/0414; F02D 41/3836; Y02T 10/40
See application file for complete search history.

(56) References Cited

U.S. PATENT DOCUMENTS

| | | | | |
|---|---|---|---|---|
| 2008/0275621 | A1* | 11/2008 | Kobayashi | F02M 61/1813 123/27 R |
| 2009/0205617 | A1* | 8/2009 | Tonetti | F02D 41/0062 60/299 |
| 2016/0341104 | A1* | 11/2016 | Redon | F02D 19/0615 |
| 2017/0204790 | A1* | 7/2017 | Nagar | F02D 41/10 |

OTHER PUBLICATIONS

Written Opinion of the International Searching Authority (PCT/ISA/237) issued in PCT/JP2021/010830, dated May 25, 2021.

* cited by examiner

FUEL INJECTION CONTROL DEVICE

TECHNICAL FIELD

The present disclosure relates to a fuel injection control device.

BACKGROUND

For example, a diesel engine is known in which a plurality of fuel injection valves, specifically, two fuel injection valves are arranged on the outer periphery of a cylinder to inject fuel into the cylinder. In this type of diesel engine, fuel injection is performed along a swirl flow formed in advance in the cylinder to obtain a good combustion state and improve thermal efficiency (see Patent Document 1, for example).

CITATION LIST

Patent Literature

Patent Document 1: JP2014-156852A

SUMMARY

Problems to be Solved

For example, the diesel engine described in Patent Document 1 is configured such that fuel injection conditions such as fuel injection pressure are determined according to the load of the diesel engine, as in the case of a general diesel engine. Specifically, in a general diesel engine, the fuel injection conditions are determined based on a control map regarding the relationship between the load of the diesel engine and the fuel injection conditions such as fuel injection pressure.

However, for example, in a two-stroke diesel engine, if the pressure balance of scavenging and exhaust gas changes, the air flow rate into the cylinder and the state of in-cylinder swirl may change. Therefore, if the fuel injection conditions are simply determined based on the control map, a good combustion state may not be obtained.

In view of the above, an object of at least one embodiment of the present disclosure is to provide a fuel injection control device that can obtain a good combustion state.

Solution to the Problems

A fuel injection control device according to at least one embodiment of the present disclosure is a device for controlling fuel injection performed by a fuel injection device disposed in a cylinder of a two-stroke engine, comprising: a scavenging and exhaust gas state quantity acquisition part configured to acquire a parameter related to a state quantity of scavenging and exhaust gas in the cylinder; a swirl momentum calculation part configured to calculate a momentum of swirl generated in the cylinder on the basis of the parameter; and a fuel injection pressure calculation part configured to calculate an injection pressure of fuel from the fuel injection device corresponding to the momentum of swirl calculated by the swirl momentum calculation part.

Advantageous Effects

According to at least one embodiment of the present disclosure, it is possible to obtain a good combustion state in a two-stroke engine.

DETAILED DESCRIPTION

Embodiments of the present disclosure will be described below with reference to the accompanying drawings. It is intended, however, that unless particularly identified, dimensions, materials, shapes, relative positions, and the like of components described in the embodiments shall be interpreted as illustrative only and not intended to limit the scope of the present disclosure.

For instance, an expression of relative or absolute arrangement such as "in a direction", "along a direction". "parallel", "orthogonal". "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

(Overall Configuration)

Figure 1:
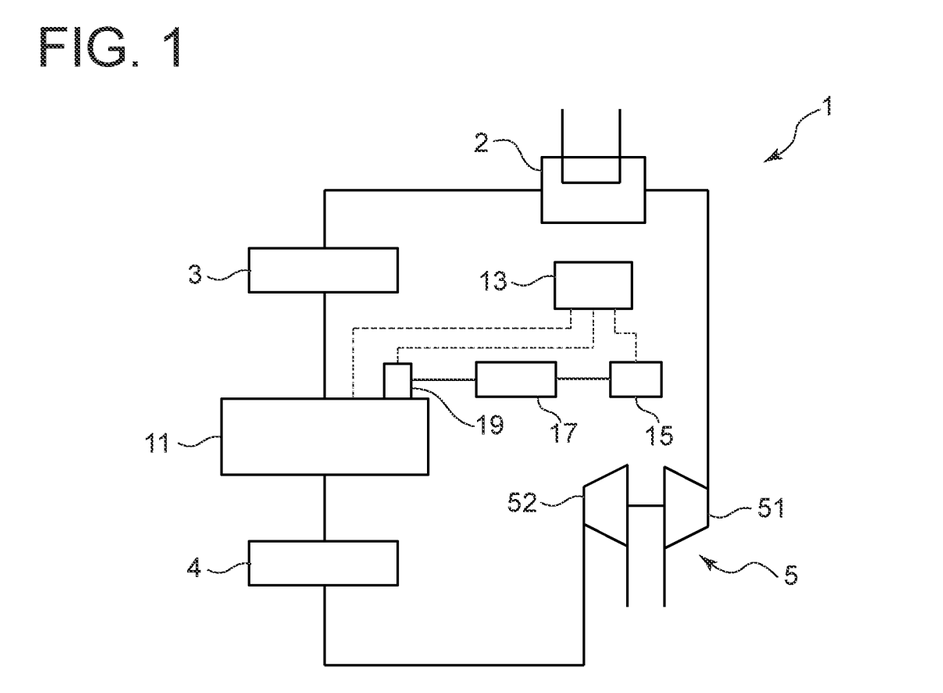
FIG. 1 is a diagram of the overall configuration of an engine and auxiliaries according to some embodiments.
Figure 2:
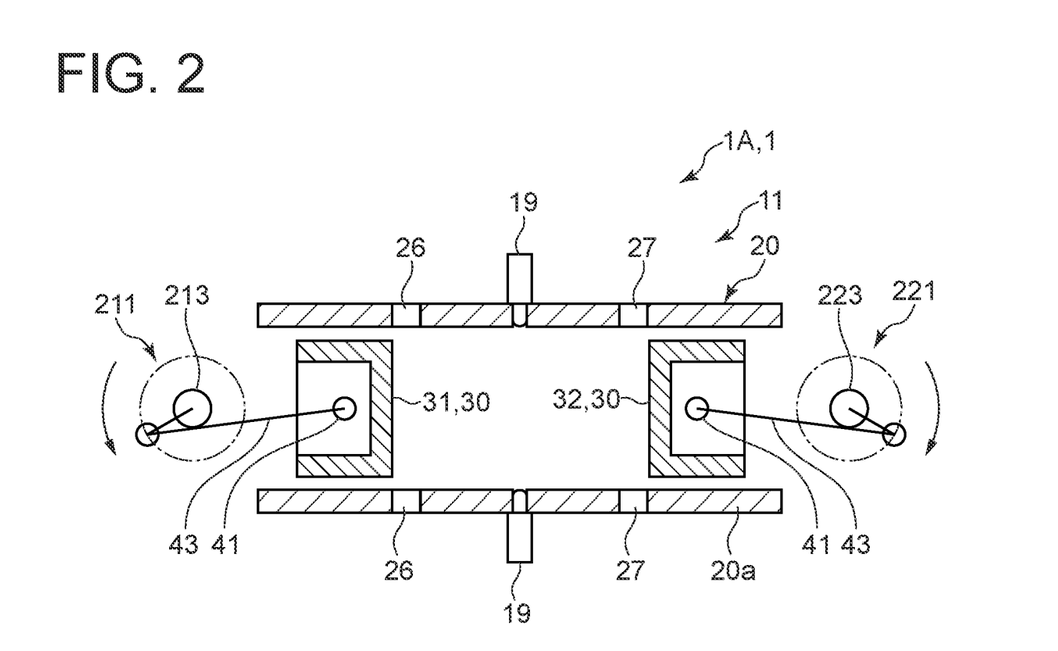
FIG. 2 is a cross-sectional view schematically showing the configuration of an engine according to an embodiment.
Figure 3:
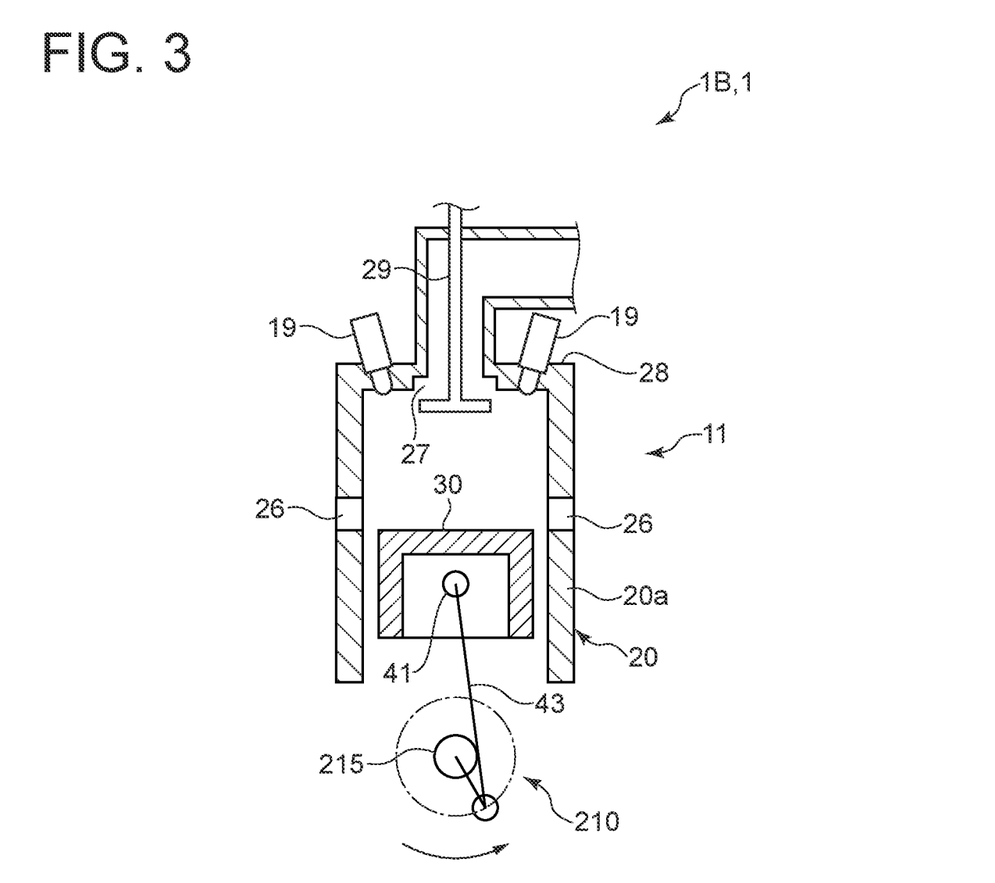
FIG. 3 is a cross-sectional view schematically showing the configuration of an engine according to another embodiment.
Figure 4:
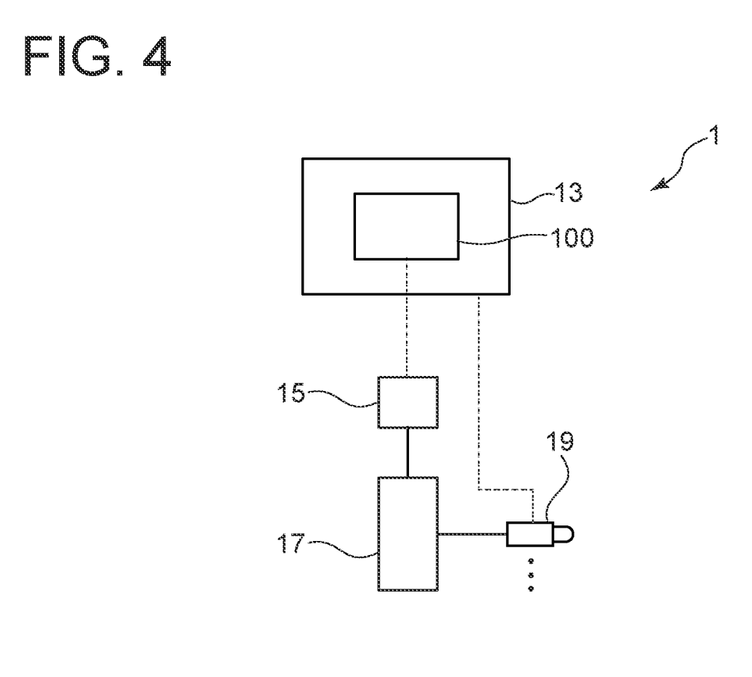
FIG. 4 is a diagram showing the configuration regarding a fuel injection system of an engine according to some embodiments.
Figure 5:
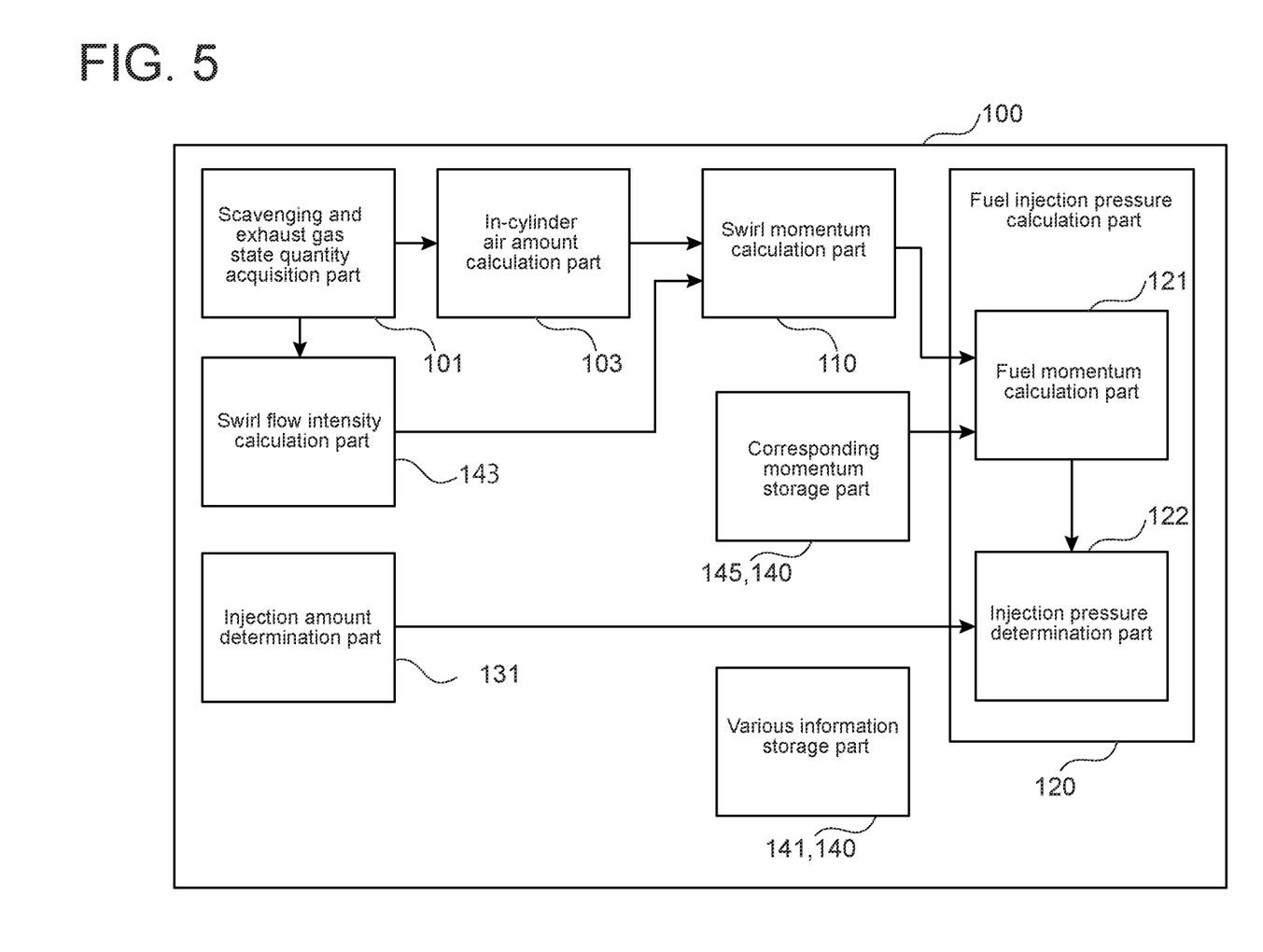
FIG. 5 is a block configuration diagram of a fuel injection control device according to an embodiment.
Figure 6:
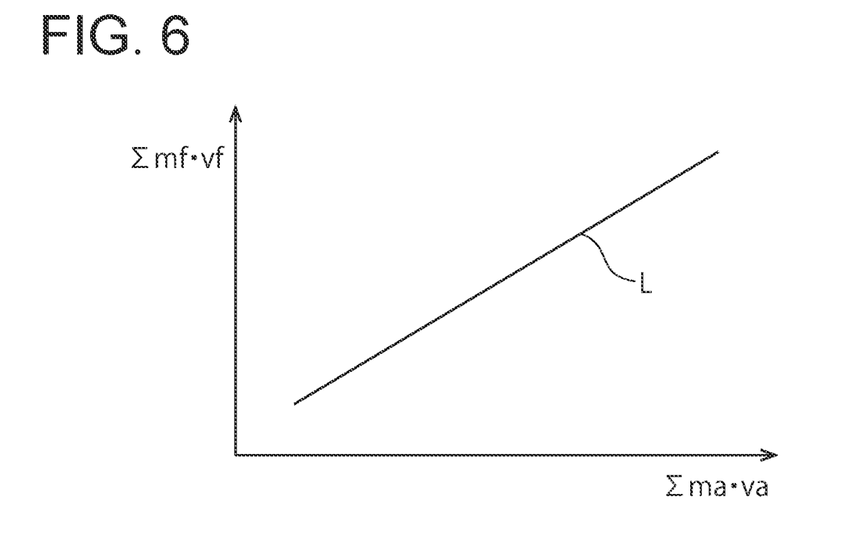
FIG. 6 is a graph showing the relationship between the momentum of fuel in a cylinder and the momentum of swirl stored in a corresponding momentum storage part.

FIG. 1 is a diagram of an overall configuration of an engine and auxiliaries according to some embodiments. FIG. 2 is a cross-sectional view schematically showing the configuration of an engine according to an embodiment. FIG. 3 is a cross-sectional view schematically showing the configuration of an engine according to another embodiment. FIG. 4 is a diagram showing the configuration regarding a fuel injection system of the engine shown in FIGS. 2 and 3. FIG. 5 is a block configuration diagram of a fuel injection control device according to an embodiment. FIG. 6 is a graph showing the relationship between the momentum of fuel in a cylinder and the momentum of swirl stored in a corresponding momentum storage part.

An engine 1 according to some embodiments is, for example, a uniflow type two-stroke diesel engine.

The engine 1 according to some embodiments includes an engine body 11, a control device (ECU) 13, a fuel pump 15, a common rail 17, a fuel injection valve 19, and a turbocharger 5.

The engine 1 according to some embodiments includes an air cooler 2, a scavenging manifold 3, and an exhaust manifold 4.

The turbocharger 5 has a compressor 51 for compressing combustion air and a turbine 52 driven by exhaust gas.

In the engine 1 according to some embodiments, the compressor 51 compresses the air. The air compressed by the compressor 51 is cooled by the air cooler 2 and supplied into a cylinder 20 of the engine body 11 via the scavenging manifold 3. Further, fuel supplied from the fuel injection valve 19 into the cylinder 20 self-ignites due to the heat of compression, so that the fuel burns and expands in the cylinder 20. Further, exhaust gas produced in the cylinder 20 is discharged to the exhaust manifold 4.

The exhaust gas discharged to the exhaust manifold 4 flows into the turbine 52 of the turbocharger 5 and drives a turbine impeller (not shown) to rotate, thereby driving the compressor 51.

The control device 13 is a control device for controlling each part of the engine 1.

The fuel pump 15 is a pump for supplying fuel to the engine 1.

The common rail 17 is a pressure accumulation device for accumulating the fuel supplied from the fuel pump 15 at a predetermined supply pressure.

The fuel injection valve 19 is a fuel injection device for injecting the fuel supplied from the common rail 17 into the cylinder 20, as described above.

As shown in FIGS. 2 and 3, the engine 1 according to some embodiments includes at least one cylinder 20 and at least one piston 30 disposed in the at least one cylinder 20. The engine 1 according to some embodiments may be, for example, a multi-cylinder engine.

In the engine 1 according to some embodiments, the at least one cylinder 20 has a plurality of fuel injection valves 19. In the engine 1 shown in FIGS. 2 and 3, for example, two fuel injection valves 19 are disposed per cylinder. In the engine 1 according to some embodiments, for example, the two fuel injection valves 19 disposed per cylinder may be arranged at an even angular pitch about the central axis of the cylinder 20.

The fuel injection valve 19 is configured to open only w % bile receiving a valve opening signal from the control device 13 to be able to inject the supplied fuel.

In the engine 1 according to some embodiments, the fuel injection valve 19 is configured to inject the fuel into the cylinder 20 in a direction of swirling around the central axis of the cylinder 20 (hereinafter, also simply referred to as the swirling direction).

The control device 13 according to some embodiments is configured to control each part so as to inject the fuel at an injection pressure corresponding to a momentum in the swirling direction of a swirl flow (hereinafter, also referred to as the momentum of swirl or the swirl momentum Σma·va), which is a flow of the combustion air formed in the cylinder 20. The control contents in the control device 13 according to some embodiments will be described in detail later.

(Engine 1A)

The engine 1A shown in FIG. 2 is, for example, an opposed-piston engine. In each of the at least one cylinder 20, a pair of pistons 30 is disposed in the same cylinder 20 and is configured to move in opposite directions along the axial direction of the cylinder 20. That is, in the engine 1A shown in FIG. 2, the at least one piston 30 includes a first piston 31 and a second piston 32 disposed opposite to the first piston 31 in the same cylinder 20 where the first piston 31 is disposed.

For example, the engine 1A shown in FIG. 2 is a single-cylinder opposed-piston engine having one cylinder, but may be a multi-cylinder opposed-piston engine having not less than two cylinders.

In the engine 1A shown in FIG. 2, the first piston 31 is connected to one end of a connecting rod 43 via a piston pin 41, and the other end of the connecting rod 43 is connected to a first crankshaft 211.

Likewise, the second piston 32 is connected to one end of a connecting rod 43 via a piston pin 41, and the other end of the connecting rod 43 is connected to a second crankshaft 221.

In the engine 1A shown in FIG. 2, the first piston 31 and the second piston 32 reciprocate in the cylinder 20 in synchronization with each other by rotation of the first crankshaft 211 about a first output shaft 213 and rotation of the second crankshaft 221 about a second output shaft 223.

In the engine 1A shown in FIG. 2, at least one scavenging port 26 is formed in a peripheral wall 20a of each cylinder 20 on one axial side of the cylinder 20, and at least one exhaust port 27 is formed in the peripheral wall 20a of the cylinder 20 on the other axial side of the cylinder 20.

In the engine 1A shown in FIG. 2, multiple scavenging ports 26 and exhaust ports 27 are arranged in the circumferential direction of each cylinder 20. In the engine 1A shown in FIG. 2, the scavenging ports 26 are connected to the scavenging manifold 3, and the exhaust ports 27 are connected to the exhaust manifold 4. In the engine 1A shown in FIG. 2, for example, the port angle of each scavenging port 26 is set so that the air flowing from the scavenging manifold 3 into the cylinder 20 forms a swirl flow in the cylinder 20.

In the engine 1A shown in FIG. 2, the fuel injection valve 19 is disposed on the peripheral wall 20a of each cylinder 20. In the engine 1A shown in FIG. 2, for example, two fuel injection valves 19 are disposed to be displaced in the circumferential direction so as to be opposite to each other across the axis of each cylinder 20 (the center of radial cross-section in each cylinder 20).

(Engine 1B)

The engine 1B shown in FIG. 3 is, for example, a uniflow type two-stroke diesel engine in which one piston 30 is disposed in one cylinder 20. For example, the engine 1B shown in FIG. 3 is a single-cylinder engine having one cylinder, but may be a multi-cylinder engine having not less than two cylinders.

In the engine 1B shown in FIG. 3, the piston 30 is connected to one end of a connecting rod 43 via a piston pin 41, and the other end of the connecting rod 43 is connected to a crankshaft 210.

In the engine 1B shown in FIG. 3, the piston 30 reciprocates in the cylinder 20 by rotation of the crankshaft 210 about an output shaft 215.

In the engine 1B shown in FIG. 3, at least one scavenging port 26 is formed in the peripheral wall 20a of the cylinder 20 on one axial side (bottom dead center side) of the cylinder 20, and at least one exhaust port 27 is formed in a cylinder head 28 disposed on the other axial side (top dead center side) of the cylinder 20.

In the engine 1B shown in FIG. 3, multiple scavenging ports 26 are disposed in the circumferential direction of the cylinder 20. In the engine 1B shown in FIG. 3, opening/closing of the exhaust port 27 is controlled by an exhaust valve 29. In the engine 1B shown in FIG. 3, the scavenging ports 26 are connected to the scavenging manifold 3, and the exhaust port 27 is connected to the exhaust manifold 4. In the engine 1B shown in FIG. 3, for example, the port angle of each scavenging port 26 is set so that the air flowing into the cylinder 20 from the scavenging manifold 3 forms a swirl flow in the cylinder 20.

In the engine 1B shown in FIG. 3, for example, the fuel injection valve 19 is disposed on the cylinder head 28. In the engine 1B shown in FIG. 3, for example, two fuel injection valves 19 are disposed to be displaced in the circumferential direction so as to be opposite to each other across the axis of the cylinder 20, and the fuel is injected in a direction including a component in a swirl flow direction.

(Fuel Injection Pressure Control)

As described above, in a general diesel engine, the fuel injection conditions are determined based on a control map regarding the relationship between the load of the diesel engine and the fuel injection conditions such as fuel injection pressure.

However, for example, in a two-stroke diesel engine, if the pressure balance of scavenging and exhaust gas changes, the air flow rate into the cylinder and the state of in-cylinder swirl change. The pressure balance of the scavenging and exhaust gas changes not only according to engine operating conditions but also according to changes in atmospheric conditions and temporal change in the engine. Therefore, if the fuel injection conditions are simply determined based on the control map, a good combustion state may not be obtained.

In view of this, the engine 1 according to some embodiments is configured to estimate the swirl flow state in the cylinder 20 as follows, and inject the fuel into the cylinder 20 at an injection pressure suitable for the estimated swirl flow state. Details will now be described.

Figure 7:
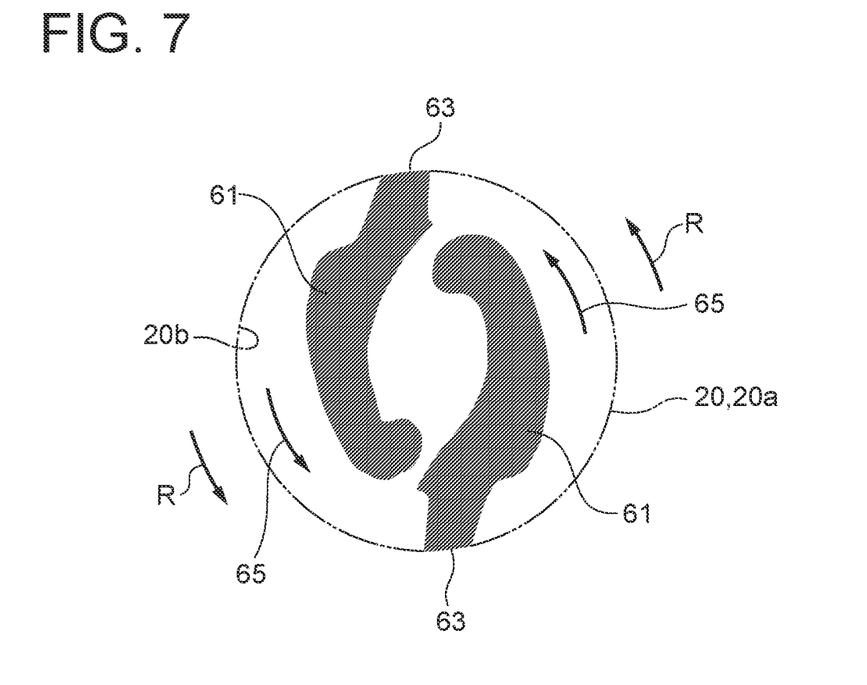
FIG. 7 is a diagram schematically showing an example of fuel injection pattern in the cylinder.

FIG. 7 is a diagram schematically showing an example of fuel injection pattern in the cylinder 20.

As a result of diligent studies by the inventors, it was found that a good combustion state can be obtained when the relationship between the swirl momentum $\Sigma ma \cdot va$ and the momentum of fuel in the cylinder 20 in the swirling direction R (hereinafter, also referred to as the fuel momentum $\Sigma mf \cdot vf$) is appropriate. If the flow state of the swirl flow 65 changes such that the swirl momentum $\Sigma ma \cdot va$ is excessively large relative to the fuel momentum $\Sigma mf \cdot vf$ in the cylinder 20 due to the change in the pressure balance of scavenging and exhaust gas, for example, the injected fuel spray 61 may interfere with an inner wall surface (cylinder wall surface) 20b of the cylinder 20 in the vicinity of the injection position 63, and the combustion state may not be good. Conversely, if the swirl momentum $\Sigma ma \cdot va$ is excessively small relative to the fuel momentum $\Sigma mf \cdot vf$ in the cylinder 20 due to the change in the pressure balance of scavenging and exhaust gas, for example, the injected fuel spray 61 may interfere with the spray 61 from the opposite fuel injection valve 19 or interfere with a cylinder wall surface 20b opposite to the injection position 63, and the combustion state may not be good.

That is, as a result of diligent studies by the inventors, it was found that a good combustion state can be obtained by approximating the relationship between the swirl momentum $\Sigma ma \cdot va$ and the fuel momentum $\Sigma mf \cdot vf$ to the correspondence as shown by line L in the graph of FIG. 6. The line L in the graph of FIG. 6 shows an example when the relationship between the swirl momentum $\Sigma ma \cdot va$ and the fuel momentum $\Sigma mf \cdot vf$ is appropriate.

The region on the lower right side of the line L in the graph of FIG. 6 is a region where the swirl momentum $\Sigma ma \cdot va$ is large relative to the fuel momentum $\Sigma mf \cdot vf$ in the cylinder 20. Further, the region on the upper left side of the line L in the graph of FIG. 6 is a region where the swirl momentum $\Sigma ma \cdot va$ is small relative to the fuel momentum $\Sigma mf \cdot vf$ in the cylinder 20.

In the engine 1 according to some embodiments, the control device 13 has the fuel injection control device 100 as a function block. The fuel injection control device 100 controls the injection pressure of fuel, as described below.

(Fuel Injection Control Device 100)

As shown in FIG. 5, the fuel injection control device 100 according to an embodiment has a scavenging and exhaust gas state quantity acquisition part 101, an in-cylinder air amount calculation part 103, a swirl flow intensity calculation part 143, a swirl momentum calculation part 110, a fuel injection pressure calculation part 120, and an injection amount determination part 131 as function blocks. Further, the fuel injection pressure calculation part 120 includes a fuel momentum calculation part 121 and an injection pressure determination part 122.

The fuel injection control device 100 according to an embodiment includes a various information storage part 141 and a corresponding momentum storage part 145 as a storage part 140 for storing various information.

(Scavenging and Exhaust Gas State Quantity Acquisition Part 101)

The scavenging and exhaust gas state quantity acquisition part 101 is a function block for acquiring a parameter related to the state quantity of scavenging and exhaust gas in the cylinder 20. In the fuel injection control device 100 according to an embodiment, the scavenging and exhaust gas state quantity acquisition part 101 acquires, for example, the pressure Psc in the scavenging manifold 3, the temperature Tsc in the scavenging manifold 3, and the pressure Pex in the exhaust manifold 4.

The scavenging and exhaust gas state quantity acquisition part 101 may be configured to acquire the pressure Psc and the temperature Tsc in the scavenging manifold 3 from a pressure sensor and a temperature sensor (not shown) installed in the scavenging manifold 3. Further, the scavenging and exhaust gas state quantity acquisition part 101 may be configured to acquire the pressure Pex in the exhaust manifold 4 from a pressure sensor (not shown) installed in the exhaust manifold 4.

(In-Cylinder Air Amount Calculation Part 103)

The in-cylinder air amount calculation part 103 is a function block for calculating the air amount in the cylinder from the scavenging density and the cylinder internal volume.

Specifically, the in-cylinder air amount calculation part 103 calculates the scavenging density $\rho sc$ on the basis of the pressure Psc in the scavenging manifold 3 and the temperature Tsc in the scavenging manifold 3 acquired by the scavenging and exhaust gas state quantity acquisition part 101.

The volume Vsc in the cylinder 20 at the end of the scavenging stroke can be obtained in advance from the cylinder diameter, stroke length, connecting rod length, compression ratio, and scavenging stroke end time (that is, the arrangement position of the scavenging port 26) in the engine 1. The air amount ma trapped in the cylinder 20 is obtained from the scavenging density ρsc and the volume Vsc of the cylinder 20 at the end of the scavenging stroke.

(Swirl Flow Intensity Calculation Part 143)

The swirl flow intensity calculation part 143 is a function block for calculating the swirl flow intensity vsl in the cylinder 20 at the end of the scavenging stroke. The swirl flow intensity vsl is calculated according to the differential pressure Δ (Psc−Pex) between the pressure Psc in the scavenging manifold 3 and the pressure Pex in the exhaust manifold 4 acquired by the scavenging and exhaust gas state quantity acquisition part 101 on the basis of the relationship between the swirl flow intensity and the scavenging and exhaust differential pressure acquired in advance by steady flow test or CFD analysis of the scavenging port 26 in the engine 1.

(Swirl Momentum Calculation Part 110)

The swirl momentum calculation part 110 is a function block for calculating the momentum of swirl (swirl momentum Marva) generated in the cylinder 20. In the fuel injection control device 100 according to an embodiment, the swirl momentum calculation part 110 calculates the swirl momentum Σma·va on the basis of the air amount in the cylinder 20, that is, the in-cylinder trapped air amount ma and the swirl flow intensity va in the cylinder 20 at the end of the piston compression.

The relationship between the swirl flow intensity vsl at the end of scavenging and the swirl flow intensity va at the end of piston compression is previously incorporated as a formula or a map by acquiring the relationship between two according to the engine rotation speed of the engine 1 by CFD or the like. Then, the swirl momentum calculation part 110 calculates the swirl flow intensity va at the end of piston compression in the cylinder 20 using the formula or the map on the basis of the swirl flow intensity vsl at the end of scavenging calculated by the swirl flow intensity calculation part 143 and the engine rotation speed, and calculates the swirl momentum Σma·va on the basis of the swirl flow intensity va and the in-cylinder trapped air amount ma.

(Injection Amount Determination Part 131)

In the injection amount determination part 131, the fuel injection amount mf is determined by a PID controller on the basis of the difference between the measured engine torque or rotation speed each time and the target engine torque or rotation speed so that the required engine output can be obtained.

(Various Information Storage Part 141)

The various information storage part 141 is a storage part which stores various data required for calculating a fuel injection pressure target value Pf*, which will be described later. In the fuel injection control device 100 according to an embodiment, for example as described above, the various information storage part 141 stores data on scavenging and exhaust characteristics of the engine 1 acquired in advance by element test or numerical simulation, data on the volume Vsc of the cylinder 20 at the end of the scavenging stroke, and data on fuel injection characteristics of the fuel injection valve 19.

(Corresponding Momentum Storage Part 145)

The corresponding momentum storage part 145 is a storage part which previously stores the fuel momentum Σmf·vf in the cylinder 20 corresponding to the swirl momentum Σma·va. In the fuel injection control device 100 according to an embodiment, the corresponding momentum storage part 145 stores conditions with which the relationship between the swirl momentum Σma·va and the fuel momentum Σmf·vf is appropriate, as shown in the graph of FIG. 6, for example.

(Fuel Injection Pressure Calculation Part 120)

The fuel injection pressure calculation part 120 is a function block for calculating the injection pressure Pf of fuel (fuel injection pressure target value Pf*) from the fuel injection valve 19 corresponding to the swirl momentum Σma·va calculated by the swirl momentum calculation part 110. In the fuel injection control device 100 according to an embodiment, the fuel injection pressure calculation part 120 reads out, from the corresponding momentum storage part 145, the fuel momentum Σmf·vf corresponding to the swirl momentum Σma·va calculated by the swirl momentum calculation part 110, and calculates the fuel injection pressure target value Pf* on the basis of the fuel momentum Σmf·vf read out from the corresponding momentum storage part 145.

Specifically, in the fuel injection pressure calculation part 120 of the fuel injection control device 100 according to an embodiment, the fuel momentum calculation part 121 reads out a necessary fuel momentum Σmf·vf according to the swirl momentum Σma·va calculated by the swirl momentum calculation part 110 from data on the relationship between the swirl momentum Σma·va and the fuel momentum Σmf·vf stored in the corresponding momentum storage part 145 on the basis of the swirl momentum Σma·va calculated by the swirl momentum calculation part 110.

The relationship between the fuel injection pressure target value Pf* and the fuel injection speed Vf is previously obtained and derived as fuel injection characteristic data in the fuel injection valve 19 by element test or numerical simulation.

Then, in the fuel injection pressure calculation part 120 of the fuel injection control device 100 according to an embodiment, the injection pressure determination part 122 calculates the injection pressure Pf of fuel required for obtaining the fuel momentum Emf·vf as the fuel injection pressure target value Pf* on the basis of the fuel momentum Σmf·vf read out from the corresponding momentum storage part 145 and the fuel injection amount mf calculated by the injection amount determination part 131.

In the engine 1 according to some embodiments, the control device 13 may be configured to control the fuel pump 15 so that the rail pressure Pr of the common rail 17 reaches the fuel injection pressure target value Pf* calculated as described above.

The present disclosure is not limited to the embodiments described above, but includes modifications to the embodiments described above, and embodiments composed of combinations of those embodiments.

The contents described in the above embodiments would be understood as follows, for instance.

(1) A fuel injection control device 100 according to at least one embodiment of the present disclosure is a device for controlling fuel injection performed by a fuel injection device (fuel injection valve 19) disposed in a cylinder 20 of a two-stroke engine, comprising: a scavenging and exhaust gas state quantity acquisition part 101 configured to acquire a parameter related to the state quantity of scavenging and exhaust gas in the cylinder 20; a swirl momentum calculation part 110 configured to calculate the momentum of swirl (swirl momentum Σma·va) generated in the cylinder 20 on the basis of the parameter; and a fuel injection pressure calculation part 120 configured to calculate an injection pressure Pf of fuel from the fuel injection valve 19 corresponding to the swirl momentum Σma·va calculated by the swirl momentum calculation part 110.

According to the above configuration (1), since fuel can be injected at the injection pressure Pf corresponding to the swirl momentum Σma·va calculated by the swirl momentum calculation part 110, for example, even if the pressure balance of scavenging and exhaust gas changes, a good combustion state can be obtained, so that the reduction in thermal efficiency in a two-stroke engine can be suppressed.

(2) In some embodiments, in the above configuration (1), the fuel injection control device 100 according to at least one embodiment further comprises a corresponding momentum storage part 145 previously storing the momentum of fuel (fuel momentum Σmf·vf) in the cylinder 20 corresponding to the swirl momentum Σma·va. The fuel injection pressure calculation part 120 is configured to read out, from the corresponding momentum storage part 145, the fuel momentum Σmf·vf corresponding to the swirl momentum Σma·va calculated by the swirl momentum calculation part 110, and calculate the injection pressure Pf of fuel from the fuel injection valve 19 on the basis of the fuel momentum Emf·vf read out from the corresponding momentum storage part 145.

According to the above configuration (2), the relationship between the swirl momentum Σma·va and the fuel momentum Σmf·vf in the cylinder 20 is likely to be kept appropriate, so that a good combustion state can be easily obtained.

(3) In some embodiments, in the above configuration (1) or (2), the fuel injection control device 100 according to at least one embodiment further comprises a swirl flow intensity calculation part 143 configured to calculate the swirl flow intensity vsl in the cylinder 20 during the scavenging stroke on the basis of the differential pressure Δ (Psc−Pex). The swirl momentum calculation part 110 is configured to calculate the swirl flow intensity va in the cylinder 20 at the end of piston compression on the basis of the swirl flow intensity vsl at the end of the scavenging stroke calculated by the swirl flow intensity calculation part 143, and calculate the swirl momentum Σma·va on the basis of the swirl flow intensity va in the cylinder 20 and the air amount (in-cylinder trapped air amount ma) in the cylinder 20.

According to the above configuration (3), it is possible to improve the calculation precision of the swirl momentum Σma·va.

REFERENCE SIGNS LIST

1, 1A, 1B Engine
5 Turbocharger
11 Engine body
13 Control device (ECU)
15 Fuel pump
17 Common rail
19 Fuel injection valve
20 Cylinder
26 Scavenging port
27 Exhaust port
100 Fuel injection control device
101 Scavenging and exhaust gas state quantity acquisition part
103 In-cylinder air amount calculation part
110 Swirl momentum calculation part
120 Fuel injection pressure calculation part
143 Swirl flow intensity calculation part
145 Corresponding momentum storage part

The invention claimed is:

1. A fuel injection control device for controlling fuel injection performed by a fuel injection device disposed in a cylinder of a two-stroke engine, comprising:
   a controller and a storage storing information that causes the controller to,
   acquire a parameter related to a state quantity of scavenging and exhaust gas in the cylinder;
   calculate a momentum of swirl generated in the cylinder on the basis of the acquired parameter; and
   calculate an injection pressure of fuel from the fuel injection device corresponding to the calculated momentum of swirl,
   wherein the fuel injection device is controlled to inject fuel into the cylinder at the calculated injection pressure.

2. The fuel injection control device according to claim 1, further comprising:
   a corresponding momentum storage previously storing a momentum of fuel in the cylinder corresponding to the momentum of swirl,
   wherein the controller is configured to read out, from the corresponding momentum storage, the momentum of fuel corresponding to the momentum of swirl calculated in the moment of swirl calculating step, and calculate the injection pressure of fuel from the fuel injection device on the basis of the momentum of fuel read out from the corresponding momentum storage.

3. The fuel injection control device according to claim 1, wherein the controller is configured to calculate a swirl flow intensity in the cylinder during a scavenging stroke, and
   wherein, in the moment of swirl calculating step, the controller is caused to read out, in the swirl flow intensity calculating step, the swirl flow intensity in the cylinder at end of the scavenging stroke, calculate a swirl flow intensity at end of piston compression on the basis of the swirl flow intensity at end of the scavenging stroke, and calculate the momentum of swirl on the basis of the calculated swirl flow intensity at end of piston compression and an air amount in the cylinder.

* * * * *